United States Patent
Takimoto et al.

(10) Patent No.: US 7,134,522 B2
(45) Date of Patent: Nov. 14, 2006

(54) REACTION FORCE CONTROL APPARATUS

(75) Inventors: Shigenori Takimoto, Utsunomiya (JP); Koji Nakajo, Utsunomiya (JP); Masato Yuda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/159,693

(22) Filed: Jun. 23, 2005

(65) Prior Publication Data

US 2006/0000663 A1  Jan. 5, 2006

(30) Foreign Application Priority Data

Jun. 30, 2004  (JP) ............................. 2004-193011
Jun. 30, 2004  (JP) ............................. 2004-193013

(51) Int. Cl.
*B62D 5/04* (2006.01)
(52) U.S. Cl. ........................................ 180/446; 701/42
(58) Field of Classification Search ................ 180/443, 180/446; 701/41, 42
See application file for complete search history.

(56) References Cited

U.S. PATENT DOCUMENTS 6,679,350 B1 * 1/2004 Shimizu et al. ............. 180/446
2004/0238257 A1 * 12/2004 Takahashi et al. .......... 180/402

FOREIGN PATENT DOCUMENTS

JP          3229074        9/2001
JP       2002370658 A   * 12/2002

* cited by examiner

*Primary Examiner*—Kevin Hurley
(74) *Attorney, Agent, or Firm*—Hamre, Schumann, Mueller & Larson, PC (57) ABSTRACT

A reaction force control apparatus for controlling a reaction force to be applied to an operation unit operated by a driver of a vehicle, the reaction force control apparatus includes a steering operation torque measuring unit for measuring steering operation torque applied to the operation unit, a vehicle movement measuring unit for measuring movement of the vehicle, and a reaction force control unit setting the reaction force to be greater as a measured value measured by the vehicle movement measuring unit is greater, and setting the reaction force to be smaller as a measured value measured by the steering operation torque measuring unit is greater.

6 Claims, 6 Drawing Sheets

REACTION FORCE CONTROL APPARATUS

BACKGROUND OF THE INVENTION

1. Field of the Invention

The present invention relates to a reaction force control apparatus for controlling reaction force to be applied to an operation unit in a steering system of a vehicle.

Priority is claimed on Japanese Patent Applications No. 2004-193011 and No. 2004-193013, filed Jun. 30, 2004, the contents of which are incorporated herein by reference.

2. Description of the Related Art

An electrical power steering apparatus is known as a steering apparatus for a vehicle. In an electrical power steering apparatus, a steering shaft connected to a steering wheel and a turning mechanism for turning steerable wheels are mechanically connected, and an electrical motor for assisting steering force is associated with the turning mechanism. In general, a driving torque command (drive current) for the electrical motor is controlled so that an assisting steering force is increased as the steering operation torque applied to the steering shaft increases.

Moreover, as such an electrical power steering apparatus, a steering system is known in which, in order to restrain irregular movement of the vehicle due to disturbance, a vehicle movement (e.g., a yaw rate) is measured by a measuring means, a drive torque correction value for compensating for the vehicle movement is calculated, a drive torque command is calculated by subtracting the drive torque correction value from a drive torque base command that is set depending on the steering operation torque, and the electrical motor is controlled according to the drive torque command (see, for example, Published Japanese Patent No. 3229074). In the steering system constructed as explained above, even during, for example, a normal turning state in which a yaw rate appears, the drive torque correction value is generated so as to reduce the yaw rate, i.e., so as to control the vehicle toward a straightforward state. Accordingly, the drive torque correction value may be defined as a reaction force with respect to an assisting force.

In general in a related art, when the reaction force is controlled depending on yaw rate information, a control operation is performed so that the reaction force (the drive torque correction value) is increased as the yaw rate increases. In other words, the driving torque of the electrical motor is controlled so that the assisting steering force by the electrical motor is decreased as the yaw rate increases. By such a control operation, a steering state is stabilized when the yaw rate is large.

However, when the reaction force is controlled in the aforementioned manner, the reaction force is controlled to be great due to a high yaw rate during a driving state in which steering operation torque is large, e.g., during a turning state with a high lateral acceleration. As a result, a large manual steering operation force is required (in other words, the steering wheel is felt heavy), and thus a problem is encountered in that steering operation feel is degraded.

Moreover, the movement of a vehicle has a phase lag with respect to a steering operation, e.g., a yaw rate has a phase lag with respect to an input to a steering wheel. When the frequency of an input to a steering wheel is higher than the yaw rate resonance frequency, the phase of the yaw rate is reversed with respect to the steering speed. In general, a greater reaction force should be generated as the yaw rate increases; however, during such a state, because the reaction force is generated with a reversed phase with respect to the steering operation, the steering wheel can be operated with a small steering operation force (i.e., the operation of the steering wheel is felt light), and a so-called "relaxed steering operation feel" is experienced. As a result, steering feel is degraded, and the object of reaction force control cannot be achieved.

SUMMARY OF THE INVENTION

In view of the above circumstances, an object of the present invention is to provide a reaction force control apparatus by which a steering operation force is not unnecessarily increased during a turning state with a high lateral acceleration, and thus a superior steering operation feel can be obtained.

Moreover, another object of the present invention is to provide a reaction force control apparatus by which reduction in steering operation force due to a phase lag of a vehicle movement with respect to a steering operation is restrained, and thus a superior steering operation feel can be obtained.

In order to achieve the above object, the present invention provides a reaction force control apparatus for controlling a reaction force to be applied to an operation unit operated by a driver of a vehicle, the reaction force control apparatus including: a steering operation torque measuring unit for measuring steering operation torque applied to the operation unit; a vehicle movement measuring unit for measuring movement of the vehicle; and a reaction force control unit setting the reaction force to be greater as a measured value measured by the vehicle movement measuring unit is greater, and setting the reaction force to be smaller as a measured value measured by the steering operation torque measuring unit is greater.

According to the construction described above, the reaction force to be applied to the operation unit can be basically set greater as the movement of the vehicle is greater. Moreover, the reaction force to be applied to the operation unit can be set smaller when the steering operation torque is large (e.g., a lateral acceleration of the vehicle is large).

In the above reaction force control apparatus, the reaction force control unit may include a dead steering operation torque zone in which the reaction force is set independently from the steering operation torque, and the dead steering operation torque zone may be set wider as a vehicle speed is higher.

According to the construction described above, it is possible in a high vehicle speed zone to set the reaction force to be small even in a relatively small steering operation torque zone, and it is also possible in a low vehicle speed zone to set the reaction force to be large up to a relatively large steering operation torque zone.

As explained above, according to the present invention, it is possible to prevent excessive increase in the steering operation force when the steering operation torque is large such as during a turning state with a high lateral acceleration, and thus a steering operation feel can be improved.

Moreover, according to the present invention, the steering operation feel can be further improved because it is possible to set the reaction force in accordance with the vehicle speed.

Furthermore, in order to achieve the above object, the present invention provides a reaction force control apparatus for controlling a reaction force to be applied to an operation unit operated by a driver of a vehicle, the reaction force control apparatus including: an operation speed measuring unit for measuring an operation speed of the operation unit; a vehicle movement measuring unit for measuring movement of the vehicle; and a reaction force control unit setting the reaction force to be greater as a measured value measured by the vehicle movement measuring unit is greater, and setting the reaction force to be smaller as a measured value measured by the operation speed measuring unit is greater.

According to the construction described above, the reaction force to be applied to the operation unit can be basically set greater as the movement of the vehicle is greater. Moreover, the reaction force to be applied to the operation unit can be set small when the steering operation speed is high, i.e., when the phase of the vehicle movement with respect to the operation applied to the steering unit is tend to be reversed.

In the above reaction force control apparatus, the reaction force control unit may include a dead operation speed zone in which the reaction force is set independently from the operation speed, and the dead operation speed zone may be set wider as a vehicle speed is lower.

According to the construction described above, it is possible in a high vehicle speed zone to set the reaction force to be small even in a relatively low steering operation speed zone, and it is also possible in a low vehicle speed zone to set the reaction force not to be reduced up to a relatively high steering operation speed zone.

As explained above, according to the present invention, because the reaction force to be applied to the operation unit can be basically set greater as the movement of the vehicle is greater, the steering operation can be stabilized. Moreover, because the reaction force to be applied to the operation unit can be set small when the steering operation speed is high, i.e., when the phase of the vehicle movement with respect to the operation applied to the steering unit is tend to be reversed, reduction in steering operation force (i.e., relaxed steering operation feel) due to a phase lag of the vehicle movement with respect to the steering operation is restrained, and thus a superior steering operation feel can be obtained.

Moreover, according to the present invention, the steering operation feel can be further improved because it is possible to set the reaction force in accordance with the vehicle speed.

DESCRIPTION OF THE PREFERRED EMBODIMENTS

A first embodiment of a reaction force control apparatus of the present invention will be explained below with reference to FIGS. 1 to 3B. In the following first embodiment, an aspect of the present invention, which is employed in an electrical power steering apparatus, is explained.

Figure 1:
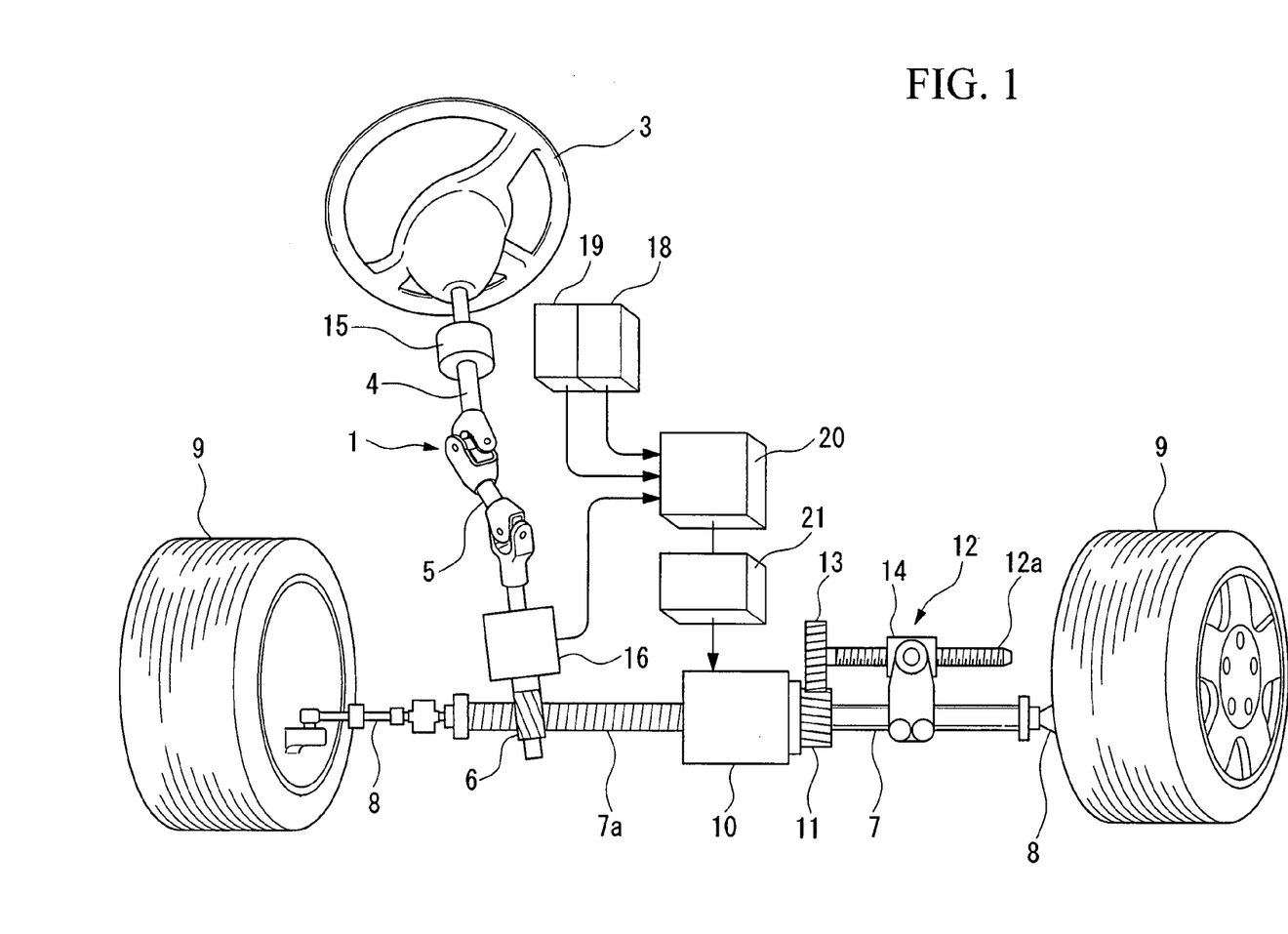
FIG. 1 is a structural diagram of an electrical power steering apparatus including a reaction force control apparatus according to a first embodiment of the present invention.

First, the construction of the electrical power steering apparatus will be explained below with reference to FIG. 1. The electrical power steering apparatus includes a manual steering force generating mechanism 1. The manual steering force generating mechanism 1 includes a steering wheel 3 (operation unit), a steering shaft 4 that is integrally connected to the steering wheel 3 and is connected to a pinion 6 of a rack and pinion mechanism via a connecting shaft having a universal joint. The pinion 6 engages a rack 7a of a rack shaft 7 that is allowed to reciprocate in a widthwise direction of the vehicle. Front wheels 9 as steerable wheels are respectively connected to the ends of the rack shaft 7 via tie rods 8. By this construction, when the steering wheel 3 is operated, a normal rack and pinion type steering operation is possible, thereby the front wheels are steered, and the vehicle can be turned. The rack shaft 7 and the tie rods 8 constitute a steering mechanism.

Moreover, on the axis of the rack shaft 7, there is provided an electrical motor 10 for applying assist steering force to assist the steering force generated by the manual steering force generating mechanism 1. The assist steering force supplied by the electrical motor 10 is converted into thrust via a ball screw mechanism 12 that is provided in a substantially parallel manner with the rack shaft 7, and is applied to the rack shaft 7. To achieve this, a driving helical gear 11 is integrated with the rotor of the electrical motor 10, a driven helical gear 13 engaging with the driving helical gear 11 is provided at an end of the screw shaft 12a of the ball screw mechanism 12, and a nut 14 of the ball screw mechanism 12 is fixed to the rack shaft 7.

A steering speed sensor 15 for measuring steering speed (angular velocity) of the steering shaft 4 is provided on the steering shaft 4, and a steering operation torque sensor 16 (a steering operation torque measuring unit) for measuring steering operation torque applied to the pinion 6 is provided in a steering gear box (not shown) that houses the rack and pinion mechanism (6 and 7a). The steering speed sensor 15 sends electrical signals corresponding to the measured steering speed to a steering control unit 20, and the steering operation torque sensor 16 sends electrical signals corresponding to the measured steering operation torque to the steering control unit 20.

In addition, a yaw rate sensor 18 (a yaw rate measuring unit, a vehicle movement measuring unit) for measuring yaw rate (vehicle movement) of the vehicle and a vehicle speed sensor 19 for outputting electrical signals corresponding to the vehicle speed are mounted on appropriate places of the vehicle body. The yaw rate sensor 18 sends electrical signals corresponding to the measured yaw rate to the steering control unit 20, and the vehicle speed sensor 19 sends electrical signals corresponding to the measured vehicle speed to the steering control unit 20.

The steering control unit 20 determines target electrical current to be supplied to the electrical motor 10 based on control signals obtained by processing input signals from the sensors 15, 16, 18, and 19, and controls output torque of the electrical motor 10 by supplying the target electrical current to the electrical motor 10 via a drive circuit 21 so as to control the assist steering force during a steering operation.

Figure 2:
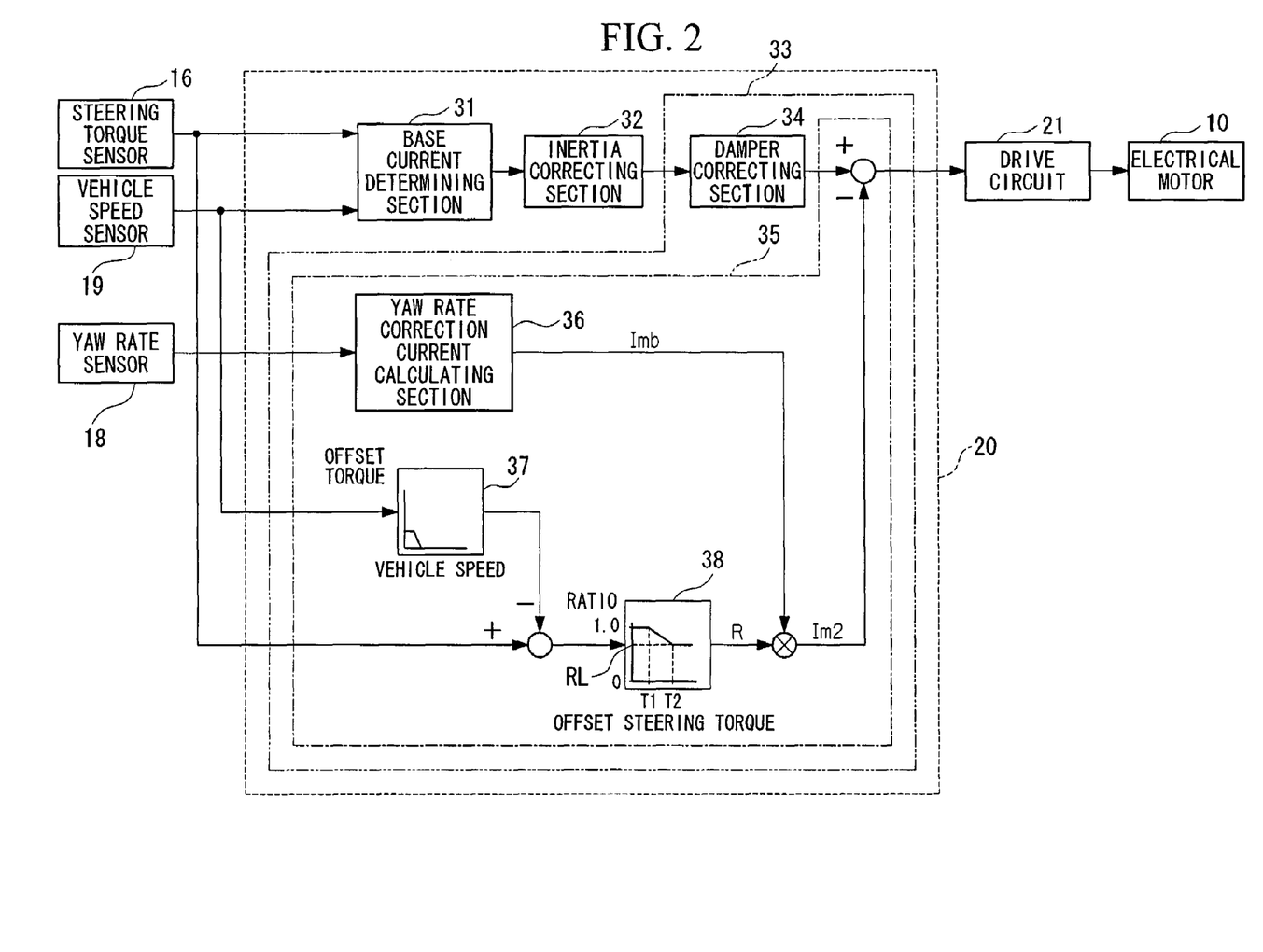
FIG. 2 is a block diagram showing a current control configuration for an electrical motor of the electrical power steering apparatus.

Next, an electrical current control operation applied to the electrical motor 10 in this embodiment will be explained below with reference to the control block diagram shown in FIG. 2.

The steering control unit 20 includes a base current determining section 31, an inertia correcting section 32, and a reaction force correcting section 33 (a reaction force control unit).

The base current determining section 31 determines base current that depends on the steering operation torque and vehicle speed based on output signals from the steering operation torque sensor 16 and the vehicle speed sensor 19 and by referring to a base current table (not shown). In the base current table, the base current is set so as to increase as the steering operation torque increases, and is set so as to decrease as the vehicle speed increases.

The inertia correcting section 32 carries out inertia mass compensation for the base current determined by the base current determining section 31.

The reaction force correcting section 33 calculates the target electrical current for the electrical motor 10 by subtracting correction current that depends on the reaction force from electrical current obtained after the inertia mass compensation, and supplies the target electrical current to the drive circuit 21. The drive circuit 21 controls the supplying current to be supplied to the electrical motor 10 so that the target electrical current is supplied to the electrical motor 10, and thus controls the output torque of the electrical motor 10.

Accordingly, in the electrical power steering apparatus in this embodiment, the correction current set in the reaction force correcting section 33 corresponds to the reaction force for the steering assist force, and the base current set in the base current determining section 31 corresponds to the steering assist force before compensating the reaction force.

The reaction force correcting section 33 consists of a damper correcting section 34 and a yaw rate reaction force correcting section 35.

The damper correcting section 34 calculates first reaction force correction current based on the steering speed, and subtracts the first reaction force correction current from electrical current obtained after inertia mass compensation.

The yaw rate reaction force correcting section 35 calculates second reaction force correction current Im2 based on the yaw rate, and calculates the target electrical current by subtracting the second reaction force correction current Im2 from electrical current output from the damper correcting section 34.

The operation for calculating the second reaction force correction current Im2 in the yaw rate reaction force correcting section 35 will be explained below in detail.

A yaw rate correction current calculating section 36 calculates reference yaw rate correction current Imb based on the output signal from the yaw rate sensor 18 by referring to a yaw rate correction current table (not shown). In the yaw rate correction current table, the reference yaw rate correction current Imb is set so as to increase (in other words, so as to increase the reaction force) as the yaw rate increases.

On the other hand, an offset torque that depends on the vehicle speed is calculated based on the output signal from the vehicle speed sensor 19 by referring to an offset table 37. In the offset table 37, the offset torque is set to be constant at a sufficiently high level in a low vehicle speed zone, and in a zone in which the vehicle speed is greater than a predetermined value, the offset torque is set so as to gradually decrease as the vehicle speed increases and to be finally "0".

A steering operation torque for calculating a ratio (hereinafter referred to as offset steering operation torque) is calculated by subtracting the offset torque from the steering operation torque measured by the steering operation torque sensor 16, and the ratio R that depends on the offset steering operation torque is calculated by referring to a steering operation torque ratio table 38. When a value (i.e., the offset steering operation torque) obtained by subtracting the offset torque from the steering operation torque is negative, the offset steering operation torque is set to be "0".

In the steering operation torque ratio table 38, the ratio R is set constant at 1.0 in a zone in which the offset steering operation torque is smaller than T1, the ratio R is set so as to gradually decrease as the offset steering operation torque increases in a zone in which the offset steering operation torque is greater than or equal to T1 and smaller than or equal to T2, and ratio R is set constant at a lower limit value RL ($1.0 > RL > 0$) in a zone in which the offset steering operation torque is greater than or equal to T2.

A product, which is obtained by multiplying the reference yaw rate correction current Imb calculated by the yaw rate correction current calculating section 36 and the ratio R obtained from the steering operation torque ratio table 38, is used as the second reaction force correction current Im2 (i.e., $Im2 = Imb \times R$).

Because the second reaction force correction current Im2 is determined by the yaw rate reaction force correcting section 35, the reaction force determined based on the yaw rate is basically controlled so as to be increased as the yaw rate increases. However, because the reaction force is multiplied by the ratio R that varies depending on the steering operation torque (more specifically, depending on the offset steering operation torque), assuming that the yaw rate is the same, the reaction force is set to be smaller when the steering operation torque is large than when the steering operation torque is small. The steering operation torque is substantially in proportion with the lateral acceleration of the vehicle, i.e., the lateral acceleration increases as the steering operation torque increases, and the lateral acceleration decreases as the steering operation torque decreases. Accordingly, the control operation that the reaction force is set smaller when the steering operation torque is large than when the steering operation torque is small means that, in other words, the reaction force is set smaller when the lateral acceleration is large than when the lateral acceleration is small. More specifically, because the reaction force (i.e., the second reaction force correction current Im2) determined based on the yaw rate is set smaller when the lateral acceleration is large than during a normal state (in which the lateral acceleration is small), the target electrical current for the electrical motor 10 and the assist steering force are also set greater when the lateral acceleration is large. As a result, unnecessary increase in the steering operation force can be prevented during, for example, a turning state with a high lateral acceleration, a moderate steering operation force can be ensured from a normal steering operation state to a turning state with a high lateral acceleration, and thus a superior steering operation feel can be obtained.

Specifically in this embodiment, because the relationship between the steering operation torque and the lateral acceleration is taken into consideration, and the steering operation torque is used for control instead of the lateral acceleration, a lateral acceleration sensor is not required, and thus construction of the apparatus can be simplified.

The reason the ratio R is calculated based on the offset steering operation torque that is obtained by subtracting the offset torque from the steering operation torque measured by the steering operation torque sensor 16 is as follows.

In the steering operation torque ratio table 38, because the ratio R is set to be 1.0 in a zone in which the offset steering operation torque is smaller than or equal to T1, the steering operation torque in the zone will not affect on setting the reaction force based on the yaw rate. The zone in which the offset steering operation torque is smaller than or equal to T1 may be referred to as a dead zone.

Figure 3A:
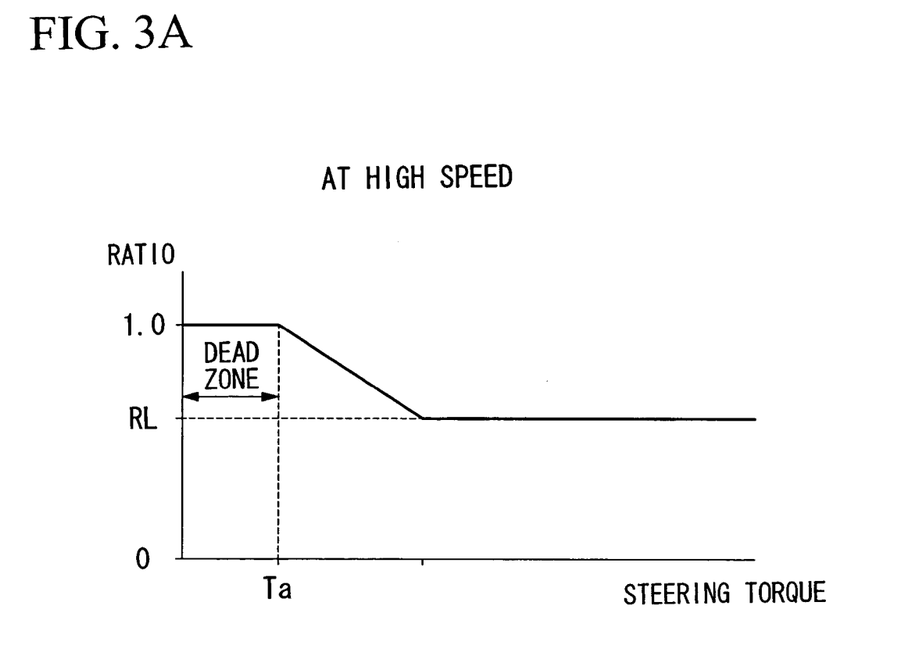
FIG. 3A is a graph showing a ratio property in a high vehicle speed zone.
Figure 3B:
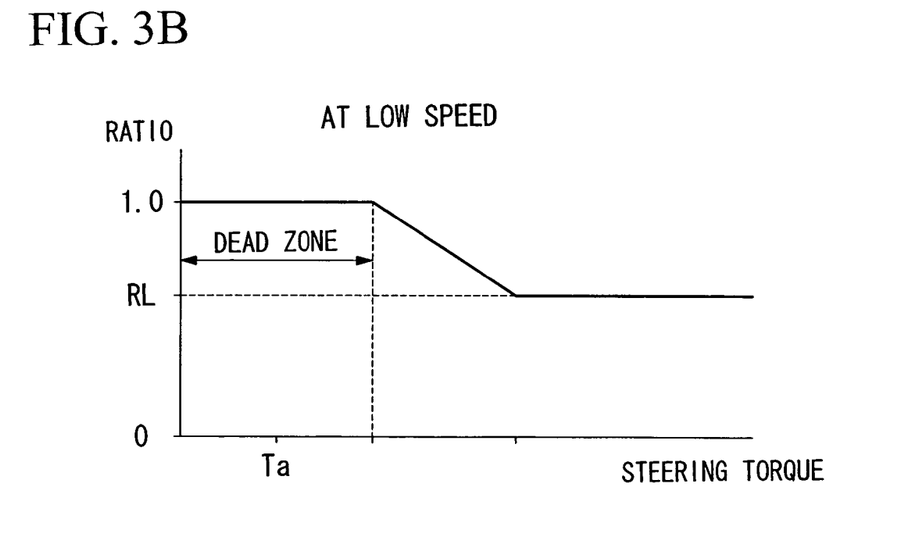
FIG. 3B is a graph showing a ratio property in a low vehicle speed zone.

On the other hand, because the offset torque is a variable that is set depending on the vehicle speed, the offset steering operation torque varies depending on the vehicle speed even when the steering operation torque is constant. FIGS. 3A and 3B are ratio property diagrams in which the horizontal axis indicates the steering operation torque, and more specifically, FIG. 3A shows the ratio property in a high vehicle speed zone, and FIG. 3B shows the ratio property in a low vehicle speed zone. By setting the offset steering operation torque as shown in FIGS. 3A and 3B, the dead zone can be made variable depending on the vehicle speed. More specifically, the dead zone in the low vehicle speed zone (refer to FIG. 3B) can be made wider than the dead zone in the high vehicle speed zone (refer to FIG. 3A).

As a result, in the high vehicle speed zone, reduction in the reaction force that depends on the yaw rate can be carried out from a relatively small steering operation torque, and in the low vehicle speed zone, reduction in the reaction force that depends on the yaw rate can be restrained up to a relatively large steering operation torque. By such a control operation, when, for example, the vehicle turns at the intersection at a low vehicle speed, the assist steering force by the electrical motor 10 can be made small, and the steering wheel can be made easy to return.

Next, a second embodiment of a reaction force control apparatus of the present invention will be explained below with reference to FIGS. 4 to 6B. In the following second embodiment, an aspect of the present invention, which is employed in an electrical power steering apparatus as in the first embodiment, is explained. In addition, the same reference symbols are applied to the same elements in the first embodiment, and explanation thereof will be omitted.

Figure 4:
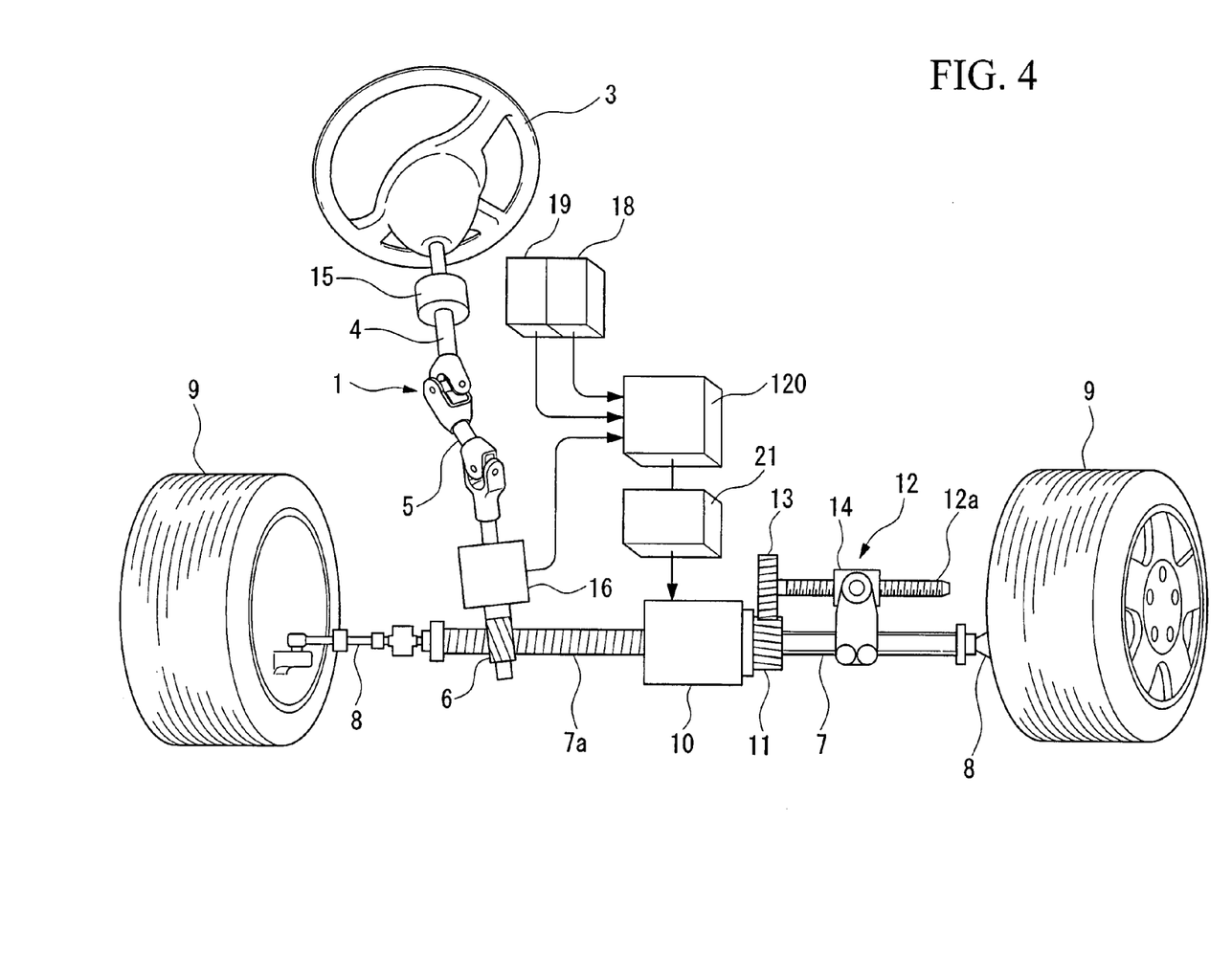
FIG. 4 is a structural diagram of an electrical power steering apparatus including a reaction force control apparatus according to a second embodiment of the present invention.

In the second embodiment, a steering control unit 120 is provided instead of the steering control unit 20.

A steering speed sensor 15 (an operation speed measuring unit) for measuring steering speed (angular velocity) of the steering shaft 4 is provided on the steering shaft 4, and a steering operation torque sensor 16 (a steering operation torque measuring unit) for measuring steering operation torque applied to the pinion 6 is provided in a steering gear box (not shown) that houses the rack and pinion mechanism (6 and 7a). The steering speed sensor 15 sends electrical signals corresponding to the measured steering speed to a steering control unit 120, and the steering operation torque sensor 16 sends electrical signals corresponding to the measured steering operation torque to the steering control unit 120.

In addition, a yaw rate sensor 18 (a yaw rate measuring unit, a vehicle movement measuring unit) for measuring yaw rate (vehicle movement) of the vehicle and a vehicle speed sensor 19 for outputting electrical signals corresponding to the vehicle speed are mounted on appropriate places of the vehicle body. The yaw rate sensor 18 sends electrical signals corresponding to the measured yaw rate to the steering control unit 120, and the vehicle speed sensor 19 sends electrical signals corresponding to the measured vehicle speed to the steering control unit 120.

The steering control unit 120 determines target electrical current to be supplied to the electrical motor 10 based on control signals obtained by processing input signals from the sensors 15, 16, 18, and 19, and controls output torque of the electrical motor 10 by supplying the target electrical current to the electrical motor 10 via a drive circuit 21 so as to control the assist steering force during a steering operation.

Figure 5:
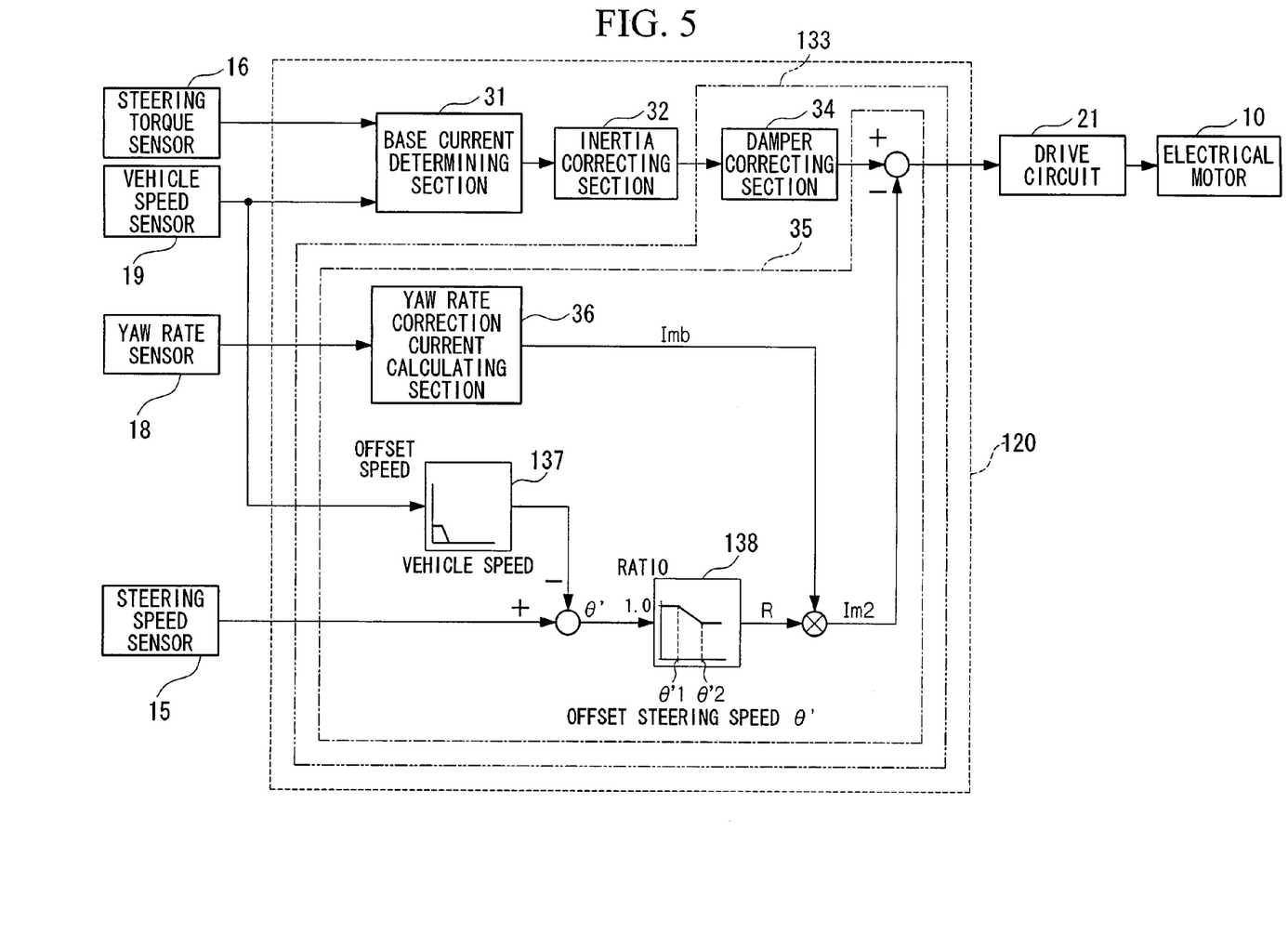
FIG. 5 is a block diagram showing a current control configuration for an electrical motor of the electrical power steering apparatus.

Next, an electrical current control operation applied to the electrical motor 10 in the second embodiment will be explained below with reference to the control block diagram shown in FIG. 5.

The steering control unit 120 includes a base current determining section 31, an inertia correcting section 32, and a reaction force correcting section 33 (a reaction force control unit).

The base current determining section 31 determines base current that depends on the steering operation torque and vehicle speed based on output signals from the steering operation torque sensor 16 and the vehicle speed sensor 19 and by referring to a base current table (not shown). In the base current table, the base current is set so as to increase as the steering operation torque increases, and is set so as to decrease as the vehicle speed increases.

The inertia correcting section 32 carries out inertia mass compensation for the base current determined by the base current determining section 31.

The reaction force correcting section 33 calculates the target electrical current for the electrical motor 10 by subtracting correction current that depends on the reaction force from electrical current obtained after the inertia mass compensation, and supplies the target electrical current to the drive circuit 21. The drive circuit 21 controls the supplying current to be supplied to the electrical motor 10 so that the target electrical current is supplied to the electrical motor 10, and thus controls the output torque of the electrical motor 10.

Accordingly, in the electrical power steering apparatus in this embodiment, the correction current set in the reaction force correcting section 33 corresponds to the reaction force for the steering assist force, and the base current set in the base current determining section 31 corresponds to the steering assist force before compensating the reaction force.

The reaction force correcting section 33 consists of a damper correcting section 34 and a yaw rate reaction force correcting section 35.

The damper correcting section 34 calculates first reaction force correction current based on the steering speed, and subtracts the first reaction force correction current from electrical current obtained after inertia mass compensation.

The yaw rate reaction force correcting section 35 calculates second reaction force correction current Im2 based on the yaw rate, and calculates the target electrical current by subtracting the second reaction force correction current Im2 from electrical current output from the damper correcting section 34.

The operation for calculating the second reaction force correction current Im2 in the yaw rate reaction force correcting section 35 will be explained below in detail.

A yaw rate correction current calculating section 36 calculates reference yaw rate correction current Imb based on the output signal from the yaw rate sensor 18 by referring to a yaw rate correction current table (not shown). In the yaw rate correction current table, the reference yaw rate correction current Imb is set so as to increase (in other words, so as to increase the reaction force) as the yaw rate increases.

On the other hand, an offset speed that depends on the vehicle speed is calculated based on the output signal from the vehicle speed sensor 19 by referring to an offset table 137. In the offset table 137, the offset speed is set to be constant at a sufficiently high level in a low vehicle speed zone, and in a zone in which the vehicle speed is higher than a predetermined value, the offset speed is set so as to gradually decrease as the vehicle speed increases, and is finally set to be "0".

A steering speed for calculating a ratio (hereinafter referred to as offset steering speed) is calculated by subtracting the offset speed from the steering speed measured by the steering speed sensor 15, and the ratio R that depends on the offset steering speed $\theta'$ is calculated by referring to a steering speed ratio table 138. When a value (i.e., the offset steering speed) obtained by subtracting the offset speed from the steering speed is negative, the offset steering speed $\theta'$ is set to be "0".

In the steering speed ratio table 138, the ratio R is set constant at 1.0 in a zone in which the offset steering speed $\theta'$ is lower than $\theta'1$, the ratio R is set so as to gradually decrease as the offset steering speed $\theta'$ increases in a zone in which the offset steering speed $\theta'$ is higher than or equal to $\theta'1$ and smaller than or equal to $\theta'2$, and ratio R is set constant in a zone in which the offset steering speed $\theta'$ is higher than or equal to $\theta'2$.

A product, which is obtained by multiplying the reference yaw rate correction current Imb calculated by the yaw rate correction current calculating section 36 and the ratio R obtained from the steering speed $\theta'$ ratio table 138, is used as the second reaction force correction current Im2 (i.e., Im2=Imb×R)

Because the second reaction force correction current Im2 is determined by the yaw rate reaction force correcting section 35, the reaction force determined based on the yaw rate is basically controlled so as to be increased as the yaw rate increases. However, because the reaction force is multiplied by the ratio R that varies depending on the steering speed (more specifically, depending on the offset steering speed), assuming that the yaw rate is the same, the reaction force (i.e., the second reaction force correction current Im2) determined based on the yaw rate is set to be smaller in a zone in which the steering speed is high than in a zone in which the steering speed is low.

The fact that the steering speed is high means that steering operation frequency is high. In general, a phase delay of the yaw rate with respect to a steering operation is increased as the steering speed increases, and the phase may finally be reversed.

As explained above, in this embodiment, because the second reaction force correction current Im2 is calculated by multiplying the reference yaw rate correction current Imb and the ratio R that is smaller than "1" in a steering speed zone in which the phase delay of the yaw rate is significant (i.e., $\theta'1<\theta'<\theta'2$), the reaction force determined based on the yaw rate can be reduced, and thus it is possible to prevent decrease in the steering operation force (i.e., relaxed steering operation feel) due to the phase delay. Accordingly, a superior steering operation feel can be obtained in the entire zone from a point at which the steering speed is low to a point at which the steering speed is high.

The reason the ratio R is calculated based on the offset steering speed that is obtained by subtracting the offset speed from the steering speed measured by the steering speed sensor 15 is as follows.

In the steering speed ratio table 138, because the ratio R is set to be 1.0 in a zone in which the offset steering speed is smaller than or equal to $\theta'1$, the steering speed in the zone will not affect on setting the reaction force based on the yaw rate. The zone in which the offset steering speed is smaller than or equal to $\theta'1$ may be referred to as a dead zone.

In general, the resonance frequency of the yaw rate has a certain relationship with the vehicle speed. More specifically, it is known that the resonance frequency of the yaw rate is low at a low vehicle speed, and the resonance frequency of the yaw rate is high at a high vehicle speed. When the resonance frequency of the yaw rate is low, it is easy for the phase of the yaw rate to be reversed at a relatively low steering speed (i.e., in a state in which a slow steering operation is applied); therefore, it is required that the dead zone be set narrower for a high vehicle speed, and be set wider for a low vehicle speed. To achieve this requirement, the offset steering speed $\theta'$ is obtained by subtracting the offset speed that varies depending on the vehicle speed from the steering speed, and the ratio R is calculated based on the offset steering speed $\theta'$.

Figure 6A:
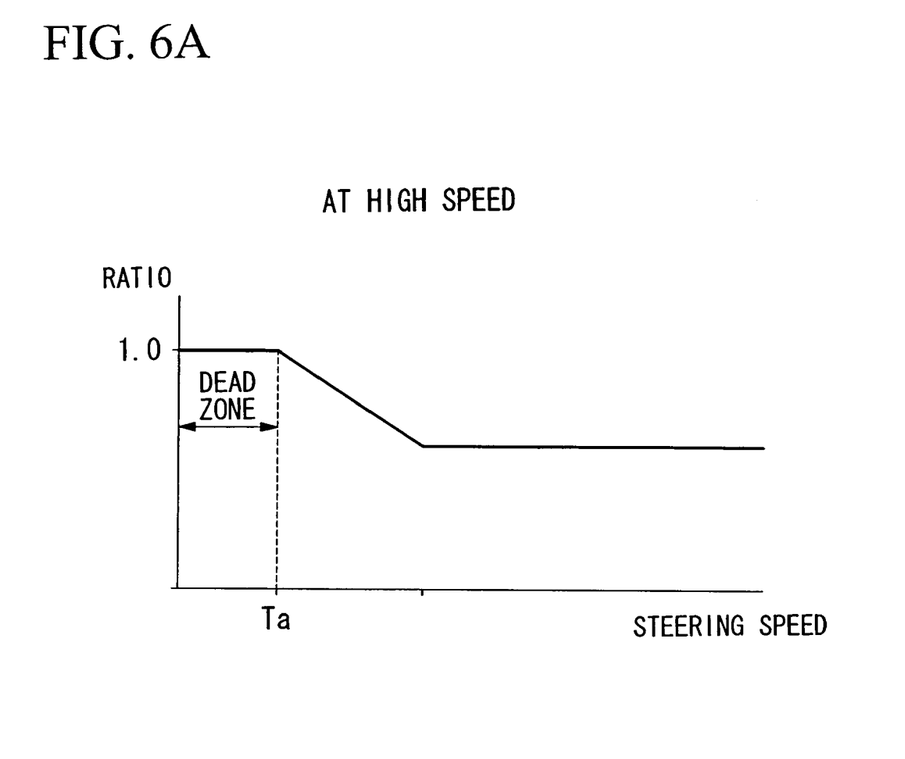
FIG. 6A is a graph showing a ratio property in a high vehicle speed zone.
Figure 6B:
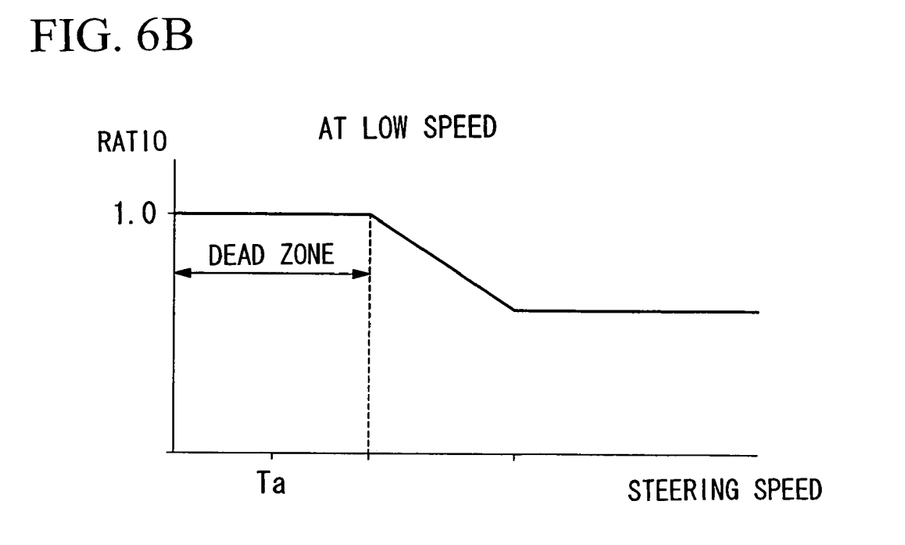
FIG. 6B is a graph showing a ratio property in a low vehicle speed zone.

FIGS. 6A and 6B are ratio property diagrams in which the horizontal axis indicates the steering speed, and more specifically, FIG. 6A shows the ratio property in a high vehicle speed zone, and FIG. 6B shows the ratio property in a low vehicle speed zone. By setting the offset steering speed as shown in FIGS. 6A and 6B, the dead zone in the low vehicle speed zone (refer to FIG. 6B) can be made wider than the dead zone in the high vehicle speed zone (refer to FIG. 6A).

Because the dead zone is made variable depending on the vehicle speed, in the high vehicle speed zone, reduction in the reaction force that depends on the yaw rate can be carried out from a relatively low steering speed, and in the low vehicle speed zone, reduction in the reaction force that depends on the yaw rate can be restrained up to a relatively high steering speed.

Other Embodiments

The present invention is not limited to the first and second embodiments described above.

For example, in the second embodiment described above, the vehicle movement is measured through a yaw rate; however, the vehicle movement can be measured through lateral acceleration. Accordingly, the present invention can be realized by measuring lateral acceleration, as the vehicle movement, using a lateral acceleration sensor (a lateral acceleration measuring unit or a vehicle movement measuring unit), and by applying the series of operations that is applied to the measured value measured by the yaw rate sensor 18 in the aforementioned embodiment to the measured value measured by the lateral acceleration sensor.

Moreover, application of the reaction force control apparatus of the present invention is not limited to the electrical power steering apparatus in the embodiment described above, and the present invention may be applicable to a vehicle steering apparatus in a steer-by-wire system (SBW), a vehicle steering apparatus in an active steering system, and to a vehicle steering apparatus in a variable gear ratio steering system (VGS).

The steer-by-wire system is a steering system that includes an operation unit, a steering mechanism that is mechanically separated from the operation unit, a reaction force motor that applies reaction force to the operation unit, and a steering motor that is provided in the steering mechanism to turn steerable wheels.

The active steering system is a steering system in which steered angle of the front wheels and steered angle of the rear wheels are controlled depending on the steering operation by the driver and vehicle motion.

The variable gear ratio steering system is a steering system in which the steering gear ratio varies depending on magnitude of the steering angle.

Further additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reaction force control apparatus for controlling a reaction force to be applied to an operation unit operated by a driver of a vehicle, the reaction force control apparatus comprising:
   a steering operation torque measuring unit for measuring steering operation torque applied to the operation unit;
   a yaw rate measuring unit for measuring yaw rate of the vehicle; and
   a reaction force control unit setting the reaction force to be greater as the yaw rate measured by the yaw rate measuring unit is greater, and setting the reaction force to be smaller as a measured value measured by the steering operation torque measuring unit is greater.

2. A reaction force control apparatus according to claim 1, wherein the reaction force control unit includes a dead steering operation torque zone in which the reaction force is set independently from the steering operation torque, and the dead steering operation torque zone is set wider as a vehicle speed is higher.

3. A reaction force control apparatus for controlling a reaction force to be applied to an operation unit operated by a driver of a vehicle, the reaction force control apparatus comprising:
   an operation speed measuring unit for measuring an operation speed of the operation unit;
   a yaw rate measuring unit for measuring yaw rate of the vehicle; and
   a reaction force control unit setting the reaction force to be greater as the yaw rate measured by the yaw rate measuring unit is greater, and setting the reaction force to be smaller as a measured value measured by the operation speed measuring unit is greater.

4. A reaction force control apparatus according to claim 3, wherein the reaction force control unit includes a dead operation speed zone in which the reaction force is set independently from the operation speed, and the dead operation speed zone is set wider as a vehicle speed is lower.

5. A reaction force control apparatus for controlling a reaction force to be applied to an operation unit operated by a driver of a vehicle, the reaction force control apparatus comprising:
   a steering operation torque measuring unit for measuring steering operation torque applied to the operation unit;
   a vehicle movement measuring unit for measuring movement of the vehicle; and
   a reaction force control unit setting the reaction force to be greater as a measured value measured by the vehicle movement measuring unit is greater, and setting the reaction force to be smaller as a measured value measured by the steering operation torque measuring unit is greater, wherein the reaction force control unit includes a dead steering operation torque zone in which the reaction force is set independently from the steering operation torque, and the dead steering operation torque zone is set wider as a vehicle speed is higher.

6. A reaction force control apparatus for controlling a reaction force to be applied to an operation unit operated by a driver of a vehicle, the reaction force control apparatus comprising:
   an operation speed measuring unit for measuring an operation speed of the operation unit;
   a vehicle movement measuring unit for measuring movement of the vehicle; and
   a reaction force control unit setting the reaction force to be greater as a measured value measured by the vehicle movement measuring unit is greater, and setting the reaction force to be smaller as a measured value measured by the operation speed measuring unit is greater, wherein the reaction force control unit includes a dead operation speed zone in which the reaction force is set independently from the operation speed, and the dead operation speed zone is set wider as a vehicle speed is lower.

* * * * *